(12) United States Patent
Smith et al.

(10) Patent No.: US 8,368,727 B2
(45) Date of Patent: Feb. 5, 2013

(54) ANGULAR DEPENDENT PIXELS FOR TRICK VIEW

(75) Inventors: Nathan James Smith, Oxford (GB); Benjamin John Broughton, Abingdon (GB); Allan Evans, Oxford (GB); Andrew Kay, Oxford (GB); Kenji Maeda, Osaka (JP); Tatsuo Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 535 days.

(21) Appl. No.: 12/689,059

(22) Filed: Jan. 18, 2010

(65) Prior Publication Data

US 2011/0175936 A1 Jul. 21, 2011

(51) Int. Cl.
*G09G 5/10* (2006.01)
(52) U.S. Cl. ........................... 345/690; 349/112
(58) Field of Classification Search .............. 345/690, 345/204, 32, 102, 87; 349/64, 66, 74, 110, 349/112
See application file for complete search history.

(56) References Cited

U.S. PATENT DOCUMENTS

| | | | |
|---|---|---|---|
| 5,831,698 A | 11/1998 | Depp et al. |
| 5,877,829 A | 3/1999 | Okamoto et al. |
| 6,211,930 B1 | 4/2001 | Sautter et al. |
| 2007/0040780 A1 | 2/2007 | Gass et al. |

FOREIGN PATENT DOCUMENTS

| | | |
|---|---|---|
| GB | 2413394 | 10/2005 |
| GB | 2428152 | 1/2007 |
| GB | 2439961 | 1/2008 |
| GB | 2457106 | 8/2009 |
| WO | 2006132384 | 12/2006 |
| WO | 2009057417 | 5/2009 |

*Primary Examiner* — Ricardo L Osorio
(74) *Attorney, Agent, or Firm* — Renner, Otto, Boisselle & Sklar, LLP

(57) ABSTRACT

A display device having a display panel for displaying an image by spatial light modulation includes a plurality of pixel groups, each pixel group including a first pixel having a first type of luminance against viewing angle response, and a second pixel having a second type of luminance against viewing angle response, wherein the first and second luminance against viewing angle responses are different from one another. The display device further includes a controller operatively coupled to each of the plurality of pixel groups, wherein the controller is configured to drive each of the plurality of pixel groups such that on average the plurality of pixel groups simultaneously provide a predetermined on-axis luminance and an predetermined off-axis luminance for a region of the image corresponding to each pixel group.

23 Claims, 9 Drawing Sheets

Figure 2
(Conventional)
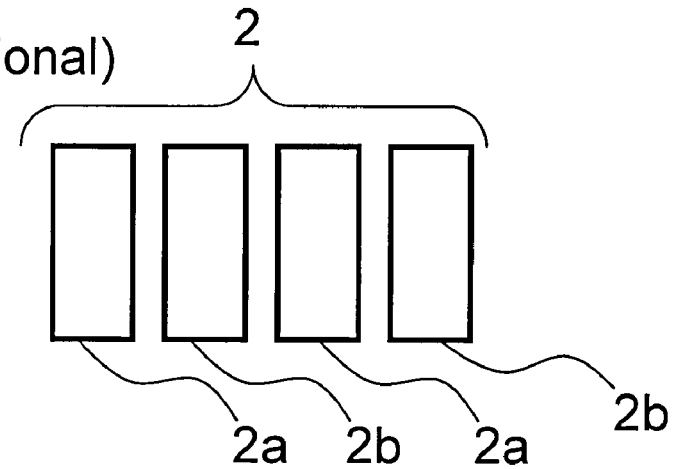

Figure 3 (Conventional)
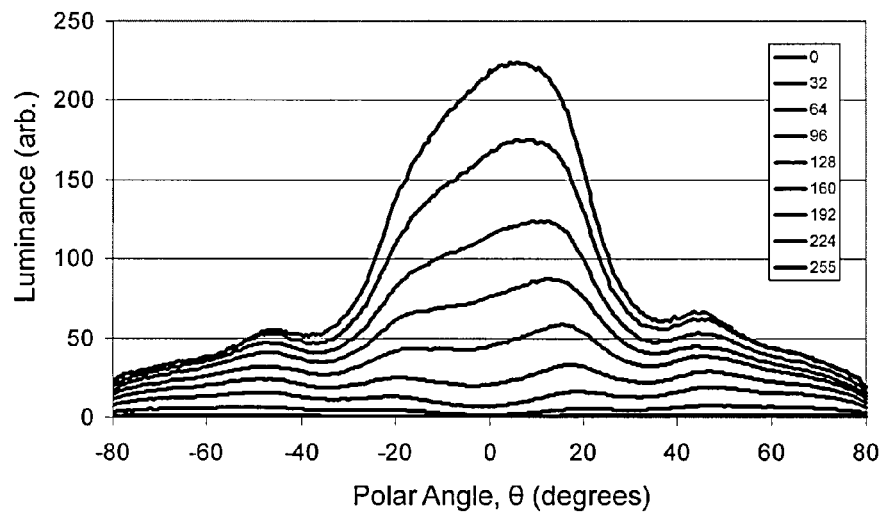
Figure 4 (Conventional)
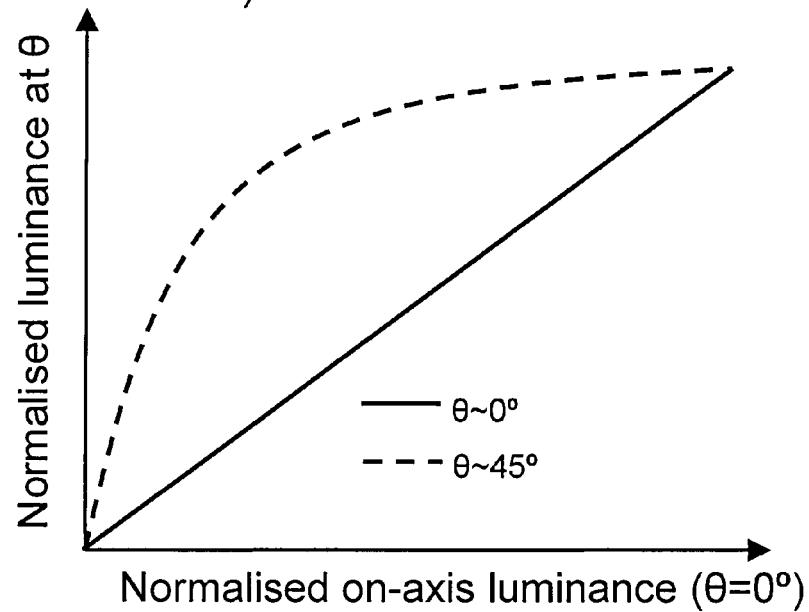

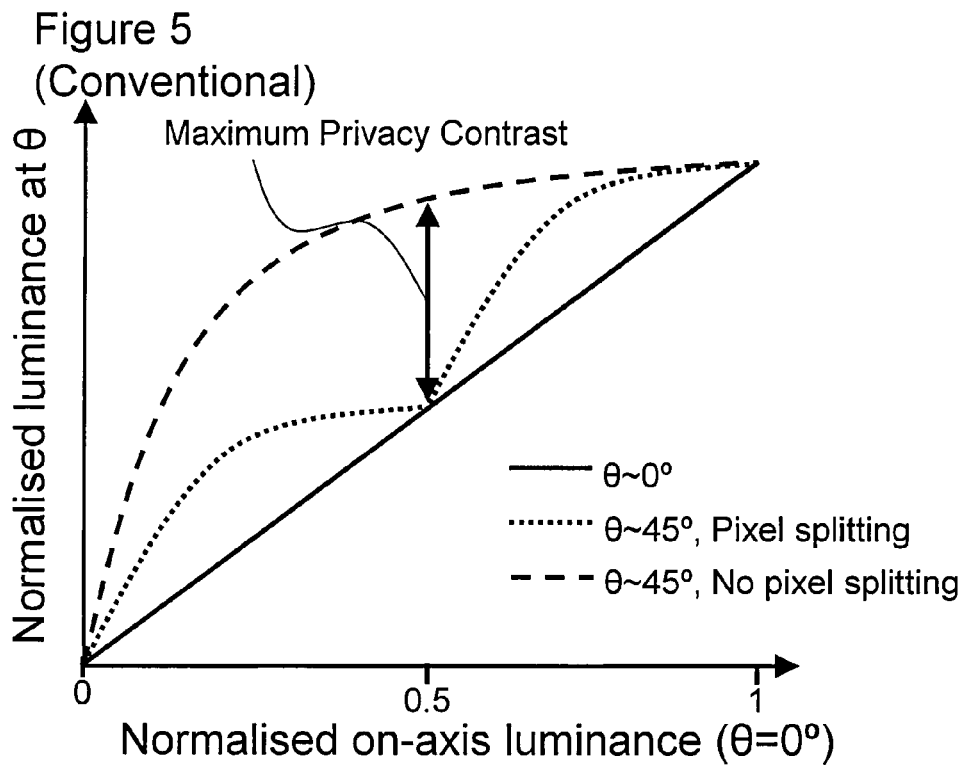
Figure 5 (Conventional)
Figure 6 (Conventional)
| Viewing Mode | Pixel 2a Normalised luminance | Pixel 2b Normalised luminance | Mean Pixel Luminance (Pixel 2a+ Pixel 2b)/2 | |
|---|---|---|---|---|
| | | | On-axis View | Off-axis View |
| No Pixel Splitting | L=0.5 | L=0.5 | L=0.5 | L=0.9 |
| Pixel Splitting 1 | L=1 | L=0 | L=0.5 | L=0.5 |
| Pixel Splitting 2 | L=0 | L=1 | L=0.5 | L=0.5 |

| Viewing Mode | Pixel 3a Normalised luminance | Pixel 3b Normalised luminance | Mean Pixel Luminance (Pixel 3a+ Pixel 3b)/2 | |
|---|---|---|---|---|
| | | | On-axis View | Off-axis View |
| No Pixel Splitting | L=0.5 | L=0.5 | L=0.5 | L=0.7 |
| Pixel Splitting 1 | L=0 | L=1 | L=0.5 | L=0.75 |
| Pixel Splitting 2 | L=1 | L=0 | L=0.5 | L=0.25 |

ANGULAR DEPENDENT PIXELS FOR TRICK VIEW

TECHNICAL FIELD

The present invention relates to a display device with an electronically switchable privacy function. More particularly, the present invention relates to a display device which enables private viewing of information in a public environment. Specific applications of the present invention may include mobile phones and other mobile products incorporating display devices.

BACKGROUND TO THE INVENTION

Electronic display devices, such as mobile phones, laptop computers, PDAs etc, are usually designed to have a viewing angle as wide as possible so that they can be read from any viewing position, i.e., a public wide view mode. However, there are some situations where a display which is visible from only a narrow range of angles is useful, i.e., a private narrow view mode. For example, one might wish to read a private document using a portable computer while on a crowded train. A number of display devices are known that can be electronically switched to restrict the range of angles or positions from which the displayed information is comprehensible.

A method for switching from a public wide view mode to a private narrow view mode with no moving parts is to mount a light control film behind the display panel, and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect. Switchable privacy devices of these types are described in U.S. Pat. No. 5,831,698 (S. W. Depp; IBM 1998), U.S. Pat. No. 6,211,930 (W. Sautter; NCR Corp. 2001) and U.S. Pat. No. 5,877,829 (M. Okamoto; Sharp K. K. 2001). These technologies share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode. Another disadvantage relates to the power consumption of these devices. In the public mode of operation, the diffuser is switched on. This often means that voltage is applied to a switchable polymer-dispersed liquid crystal diffuser. More power is therefore consumed in the public mode than in the private mode. This is a disadvantage for displays which are used for most of the time in the public mode.

In GB2413394 (R. Winlow; Sharp 2005), a switchable privacy device is described that has one or more additional liquid crystal layers and polarisers added to the display panel. The intrinsic viewing angle dependence of these extra elements can be changed by switching the liquid crystal electrically in a well-known way. Devices utilising this technology include the commercially available Sharp Sh851i and Sh902i mobile phones.

WO06132384A1 (D. Kean; Sharp, 2006) discloses the use of an extra liquid crystal layer located between the existing polarisers of a liquid crystal display (LCD) panel. In this location, the extra switch cell can modify the greyscale curves for off axis light. This provides a higher level of privacy for images than the techniques disclosed in GB2413394.

GB2439961 (N. Smith; Sharp 2008) discloses the use of a switchable privacy device constructed by adding an extra cholesteric layer and circular polarisers to a display panel. The cholesteric layer can be switched between a public wide view mode and a private narrow view mode, providing 360° privacy for a given range of polar angles.

Methods that utilise an additional liquid crystal layer (GB2413394, WO06132384A1, GB2439961) add thickness to the resulting display module. Additional thickness is very undesirable, particularly in mobile display applications such as mobile phones and laptop computers.

Methods to control the viewing angle properties of an LCD by switching the single liquid crystal layer of the display between two different configurations, both of which are capable of displaying a high quality image to the on-axis viewer, are described in US20070040780A1 (P. Gass; Sharp 2007) and WO/2009/057417 (B. Broughton; Sharp 2009). These devices provide the switchable privacy function without the need for added display thickness, but require complex pixel electrode designs and other manufacturing modifications to a standard display.

One example of a display device that has privacy mode capability with no added display hardware complexity is the commercially available Sharp Sh7021S mobile phone. The privacy function in the SH702i is achieved via manipulation of the displayed image data in conjunction with the angular dependent data-luminance properties inherent to the liquid crystal mode. However, while in the private mode, the quality of the image displayed to the legitimate on-axis viewer is severely degraded.

A similar scheme to that used on the Sh7021S phone, but which manipulates the image data in a manner dependent on a second, masking, image, and therefore causes that masking image to be perceived by the off-axis viewer when the modified image is displayed, is described in GB2428152A1 (T. Wynne-Powell; Sharp 2007), US20070040780A1 and GB2457106A (B. Broughton; Sharp 2009). However, the image processing methods described in GB2428152A1 rely on the off-axis to on-axis luminance curve being strongly non-linear, which is not the case for some display modes, for example, in-plane switching (IPS) LC display modes and OLEDs. As a result, the privacy effect is not sufficiently strong in these display devices to disguise the on-axis image from an off-axis viewer.

It is therefore desirable to provide a high quality display with a switchable privacy feature whereby:
i) In the public mode, the on-axis and off-axis display performance (brightness, contrast resolution etc.) is not compromised.
ii) In the private mode, the on-axis display performance (brightness, contrast resolution etc.) has minimal degradation relative to the public mode.
iii) In the private mode, the privacy strength is sufficient to render images, text, etc. unintelligible to an off-axis viewer.
iv) No appreciable thickness or cost is added to the display module.

SUMMARY OF THE INVENTION

According to a first aspect of the invention, there is provided a pixelated image display, optics for creating directional pixels on the display, and a method of image processing for the display in order to yield a display system with an electronically switchable privacy function. The privacy strength of the display device is stronger than for a display device that does not have directional pixels.

According to a second aspect of the invention, there is provided a pixelated image display, optics for creating directional pixels on the display, and a method of image processing for the display in order to yield a display system with an electronically switchable privacy function. The optics modify the intrinsic luminance-data response of the display to enable compatibility with the image processing technique for creating an electronically switchable privacy function.

According to a third aspect of the invention, the pixelated image display and optics for creating directional pixels on the display are arranged in such a manner as to provide the capability of viewing autostereoscopic 3D images in addition to the capability of viewing of standard 2D images and text. The implementation of image processing enables a switchable privacy function for the autostereoscopic 3D display. The switchable privacy function can be activated when viewing autostereoscopic 3D images, enabling private viewing of 3D images. The switchable privacy function can also be activated when viewing standard 2D images and text, enabling private viewing of non-3D images on the 3D display.

For each aspect of the invention there is at least a first type of pixel in the display device that has a first type of luminance against viewing angle response (i.e., a first directional pixel) and there is at least a second type of pixel in the display device that has a second type of luminance against viewing angle response (i.e., a second directional pixel). The luminance against viewing angle response refers to the functional form of the plot of pixel luminance as a function of viewing angle, as shown in FIGS. 3, 10, 15 and 16. For a colour display in which each pixel comprises multiple sub-pixels each of a given colour component, e.g. red, green and blue, the colour component sub-pixels may themselves have slightly different luminance against viewing angle responses. However this is not what is referred to, and in this case, the invention should be taken to comprise whole pixels, or colour sub-pixels of the same colour type within different whole pixels, which have a different luminance against viewing angle response. The luminance against viewing angle response of the first pixel type is different to the second pixel type.

The directional pixels may be formed via parallax optics, for example. The parallax optic may be a parallax barrier that is comprised of transmissive and non-transmissive regions. The parallax optic may be comprised of a lens array. The parallax optic may be comprised of a parallax barrier and lens array. The parallax optic may be comprised of a prism array. The parallax optic may be periodic in one dimension. The parallax optic may be periodic in two dimensions. The pitch of the parallax optic may be corrected to enable even viewing of images across the extent of the image panel display.

The directional pixels in transmissive displays may be formed via directional backlighting, for example. The directional pixels may be formed via patterned holographic or diffractive optical elements, for example. The directional pixels may be formed via patterned out-coupling optics in an OLED display, for example. The directional pixels may be formed via patterned optical retarders, for example. The directional pixels may be formed via a collimated backlight and patterned scattering optics, for example.

The pixelated image display may be comprised of, but is not limited to: a Liquid Crystal Display (LCD) or an Organic Light Emitting Diode (OLED) display or a Plasma Display Panel (PDP) or an Electrophoretic display or an Electrowetting display Field Emission Display (FED), or a Surface-conduction Electron-emitter Display (SED), (LED), etc. The pixelated image display may be, for example, transmissive or emissive or reflective or transflective in nature.

According to one aspect of the invention, a display device having a display panel for displaying an image by spatial light modulation includes: a plurality of pixel groups, each pixel group including a first pixel having a first type of luminance against viewing angle response, and a second pixel having a second type of luminance against viewing angle response, wherein the first and second luminance against viewing angle responses are different from one another; and a controller operatively coupled to each of the plurality of pixel groups, wherein the controller is configured to drive each of the plurality of pixel groups such that on average the plurality of pixel groups simultaneously provide a predetermined on-axis luminance and an predetermined off-axis luminance for a region of the image corresponding to each pixel group.

According to one aspect of the invention, the controller is further configured to control the plurality of pixel groups such that the average off-axis luminance of each pixel group is controlled independent of the average on-axis luminance.

According to one aspect of the invention, the controller is further configured to control a share of the overall luminance of the pixel group that is produced by each individual pixel within the pixel group, wherein increasing the share of overall luminance produced by the first pixel within the pixel group and decreasing the share of overall luminance produced by the second pixel within the pixel group increases the overall off-axis luminance, and wherein decreasing the share of overall luminance produced by the first pixel within the pixel group and increasing the share of overall luminance produced by the second pixel of the pixel group decreases the overall off-axis luminance.

According to one aspect of the invention, the controller is further configured to drive each pixel group of the plurality of pixel groups such that each pixel group produces an average on-axis luminance dependent on image data corresponding to a spatial region of an input image that each pixel group occupies in the display panel, and an off-axis luminance that is proportional to the on-axis luminance so as to reproduce the input image to viewing angles greater than 35 degrees to a normal of the display panel surface.

According to one aspect of the invention, the controller is further configured to drive each pixel group such that each pixel group produces an average on-axis luminance dependent on first image data corresponding to a spatial region of a main input image that each pixel group occupies in the display panel, and a simultaneous off-axis luminance that is independent of the first image data.

According to one aspect of the invention, the off-axis luminance is dependent on data corresponding to a spatial region of a secondary image data different from the first image data that each pixel group occupies in the display panel.

According to one aspect of the invention, in a first viewing mode the controller is configured to apply first and second signal voltages to the first and second pixels, respectively, such that on average the pixel group produces generally the same viewing angle to luminance response over a predetermined viewing range, and in a second viewing mode the controller is configured to apply third and fourth signal voltages to the first and second pixels, respectively, such that on average at least some pixel groups produce a viewing angle to luminance response that varies over the predetermined viewing range.

According to one aspect of the invention, in the first viewing mode the respective signal voltages are based on an image data value for each pixel, and in the second viewing mode the respective signal voltages are based on the image data value for each pixel and a predetermined secondary value.

According to one aspect of the invention, the luminance against viewing angle response for at least one of the first or second pixel of at least one pixel group is independent of an absolute luminance value (a luminance of the relevant pixel type, i.e., the luminance against viewing angle response does not change with on-axis luminance, as can be seen in FIG. 3).

According to one aspect of the invention, the luminance against viewing angle response for at least one of the first or second pixel of at least one pixel group is dependent on of an absolute luminance value.

According to one aspect of the invention, the different luminance against viewing angle response of the first and second pixels of at least one pixel group is utilized such that in at least one display mode a normalized average off-axis luminance of each pixel group approximates a normalized average on-axis luminance of each pixel group (within the same accuracy as the display of the type in FIG. 13 (always less than 20% error)).

According to one aspect of the invention, the luminance against viewing angle responses of the first and second pixels of at least one pixel group are configured to allow the display panel to produce an autostereoscopic 3D image in one viewing mode, a privacy effect in another viewing mode, and a simultaneously autostereoscopic 3D image with privacy effect in a third viewing mode.

According to one aspect of the invention, at least one of the first or second pixels includes parallax optics arranged relative to the first and second pixels.

According to one aspect of the invention, the parallax optics are symmetrically centered about the first and second pixels.

According to one aspect of the invention, the parallax optics comprise at least one of a lens array, a parallax barrier, or a prism array.

According to one aspect of the invention, the parallax optics comprise a lens array, wherein a pitch of the lens array is two times a pitch of the first or second pixels.

According to one aspect of the invention, the parallax optics comprise a parallax barrier, and a pixel to parallax distance set to a pixel pitch.

According to one aspect of the invention, the parallax optics are periodic in at least one dimension.

According to one aspect of the invention, the parallax optics are configured to modify an intrinsic luminance-data response of the first and second pixels.

According to one aspect of the invention, the luminance against viewing angle response of the first and second pixels is generated using at least one of a directional backlight, a patterned holographic or diffractive optical element, a patterned optical retarder, a collimated backlight and pattern scattering optics, or patterned out-coupling optics.

According to one aspect of the invention, the display panel comprises at least one of a liquid crystal display, an organic light emitting diode display, a plasma display, a field emission display, or a surface-conduction electron-emitter display.

According to one aspect of the invention, a difference between the luminance against viewing angle response of the first and second pixels is less than xxx.

According to one aspect of the invention, a method for creating at least two viewing modes on a display device, the display device including a plurality of pixel groups each having at least two pixels is provided. The method includes: creating a first type of luminance against viewing angle response for one pixel of the at least two pixels; creating a second type of luminance against viewing angle response for the other pixel of the at least two pixels, wherein the first and second luminance viewing angle response are different from one another; driving each of the plurality of pixel groups such that on average the plurality of pixel groups simultaneously provide a predetermined on-axis luminance and an predetermined off-axis luminance for a region of the image corresponding to each pixel group.

An advantage of the invention is that the use of additional optics to create different pixels with different angular dependent luminance functions (i.e. multi-directional pixels), in conjunction with image processing techniques, enables an electronically switchable privacy function for any type of pixelated image display. The universal applicability of the invention to provide a switchable privacy function for any type of pixelated information display has commercial advantage. A further advantage is the use of additional optics to create multi-directional pixels, in conjunction with image processing techniques, to enable a switchable privacy effect in display types which have a linear off-axis to on-axis luminance characteristic of the type described in GB2457106A. Without the use of additional optics to create multi-directional pixels, displays with a linear off-axis to on-axis luminance characteristic would not be able to provide a privacy effect according to the methods described in GB2457106A.

A further advantage is that image processing techniques may be used in conjunction with multi-directional pixels to provide a display that has minimal colour variation with respect to viewing angle.

A further advantage is that the use of additional optics to create multi-directional pixels, in conjunction with image processing techniques, can provide a stronger privacy function than that described in GB2457106A for a display that has an intrinsic non-linear off-axis to on-axis luminance characteristic.

A further advantage is that by designing the optics for creating directional pixels appropriately, privacy in both the horizontal and vertical directions (360°) can be achieved with the appropriate image processing.

A further advantage is that the privacy function is compatible with autostereoscopic 3D displays, enabling private viewing of autostereoscopic 3D images and private viewing of standard 2D images and data.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 2 represents an array of pixels in accordance with a typical display device;

FIG. 3 is a plot representing an angular dependent luminance response for a pixel in a known display device;

FIG. 4 is a plot representing a Normalised luminance at θ against Normalised on-axis luminance for a single pixel in a known display device that uses image processing techniques to enable a switchable privacy function;

FIG. 5 is a plot representing a Normalised luminance at θ against Normalised on-axis luminance for a pair of pixels in a known display device;

FIG. 6 is a table illustrating average pixel luminance for a pair of pixels in a known display device;

DESCRIPTION OF THE INVENTION

Figure 1:
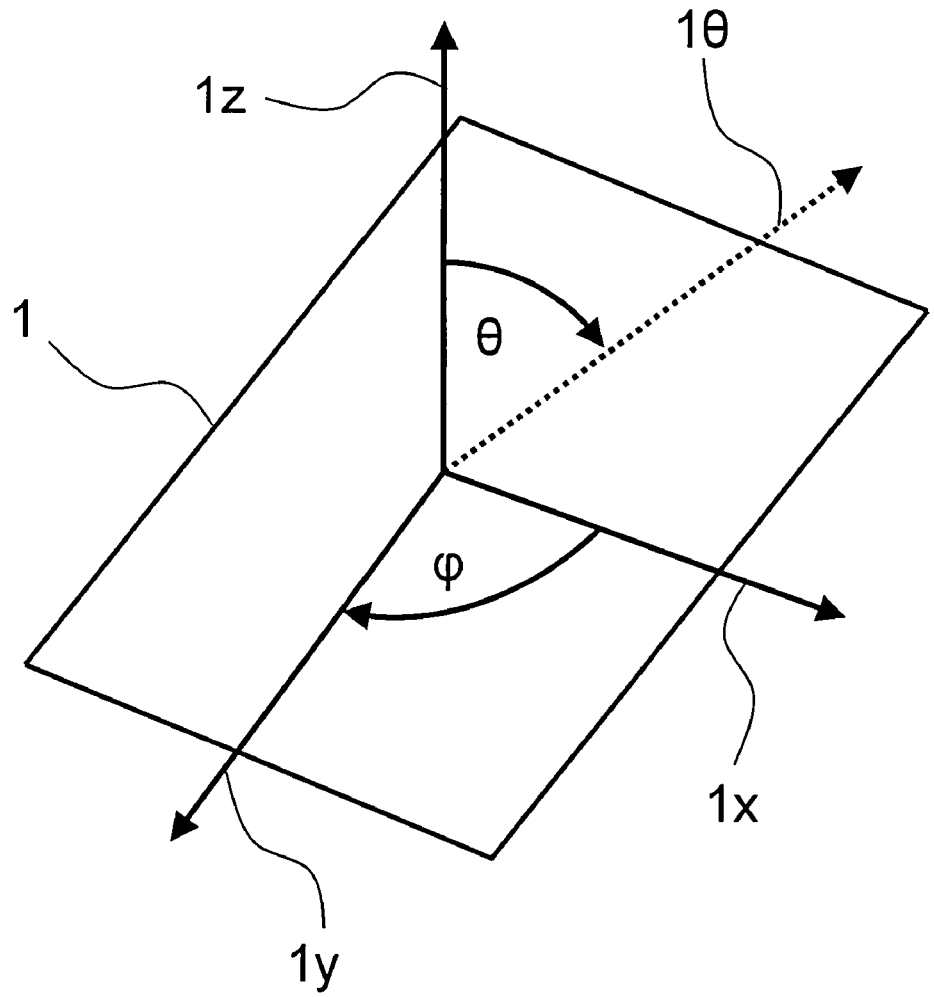
FIG. 1 defines a coordinate system in relation to a display device in accordance with the present invention as described herein.

The coordinate system used to describe embodiments of the invention is shown in FIG. 1 and illustrates a display device 1 in relation to the three orthogonal coordinate axes, 1x, 1y and 1z. Normal to the plane of the display device 1 is the coordinate axis labelled 1z. Coordinate axes 1x and 1y are in the plane of the display 1. The polar angle θ between 1z and 1x describes the viewing angle for display 1, with) θ~0° (−10°<θ<10°) a substantially on-axis view. A switchable privacy function should render the displayed information on display device 1 unintelligible for a substantially off-axis view, i.e. θ>~35°. The azimuth angle φ describes the angle between the 1x and 1y axes.

An array of pixels 2 (image elements) attributed to display 1 is shown in FIG. 2. Each pixel 2a and 2b has an angular dependent luminance response that is substantially the same and is shown in FIG. 3, for a range of on axis brightness states. A plot of Normalised luminance at θ against Normalised on-axis luminance (θ=0°) is shown schematically in FIG. 4 for a given display type. As illustrated in FIG. 4, the luminance response of the LCD is non-linear for off-axis angles (θ~45°). This non-linear luminance response is typical of many types of vertically aligned LC modes. Prior art GB2428152A1, US20070040780A1 and GB2457106A describe an image processing technique that utilises the off-axis non-linearity in luminance response of an LCD, as illustrated in FIG. 4, to enable a switchable privacy function. The details of the image processing technique described in GB2428152A1, US20070040780A1 and GB2457106A will not repeated here in any detail. Instead, the essential features of GB2428152A1, US20070040780A1 and GB2457106A are summarized below to provide clarity for the reader.

The display device 1 comprises a display controller arranged to determine a signal voltage to be applied to each of the display's pixels. In the public wide view mode, the signal voltage for a given pixel is entirely dependent upon the image data value of the pixel—this situation is henceforth known as "no pixel splitting". In the private narrow view mode, the signal voltage for a given pixel is dependent upon the image data value of the pixel and a given secondary value—this situation is henceforth know as "pixel splitting". The secondary value may be positive, negative or zero and there is a predetermined mapping between the data values and the signal voltage. The mapped data values and secondary values are mutually arranged to vary across the image so as to introduce variations in luminance. The mapped data values and secondary data values are arranged to take account of the luminance response of the display, as illustrated in FIG. 4, so that the luminance variations introduced on-axis are substantially balanced through local spatial averaging and hence the luminance variations are not perceivable by an on-axis viewer. Since the panel has a non-linear off-axis luminance to on-axis luminance relationship, as illustrated in FIG. 4, some of the luminance variations introduced by the mapped data values and secondary values do not substantially balance locally through spatial averaging to an off-axis viewer, and hence are perceivable by an off-axis viewer. These off-axis luminance variations render the off-axis image unintelligible and hence provide a privacy function for the on-axis viewer.

The switchable privacy function and the role of pixel splitting are described further with reference to FIG. 5 and FIG. 6. A plot of Normalised luminance at a given θ against Normalised on-axis luminance (θ=0°) is shown schematically in FIG. 5 for a pair of pixels in a given LCD. FIG. 5 illustrates that the off-axis luminance (θ~0°) response for the no pixel splitting situation and the off-axis luminance (θ~0°) response for the pixel splitting situation are different. Consequently, an off-axis contrast can be derived between two pairs of pixels whereby 1 pair of pixels has undergone splitting and the other pair of pixels has not undergone splitting. On-axis, both pairs of pixels can be contrived to have the same average luminance. The area enclosed by the pixel splitting line and the no pixel splitting line in FIG. 5 indicates the available values that the off-axis luminance for a pair of pixels may take. The maximum privacy contrast between the pixel splitting and no pixel splitting line is shown in FIG. 5 by the double ended arrow. The maximum theoretical value that the contrast can have with this system is 2, assuming the display does not suffer from contrast inversion, i.e. the state of the pixel which is brightest on-axis is also the brightest state off-axis. The magnitude of this contrast is a measure of the privacy strength that be obtained.

Figure 17:
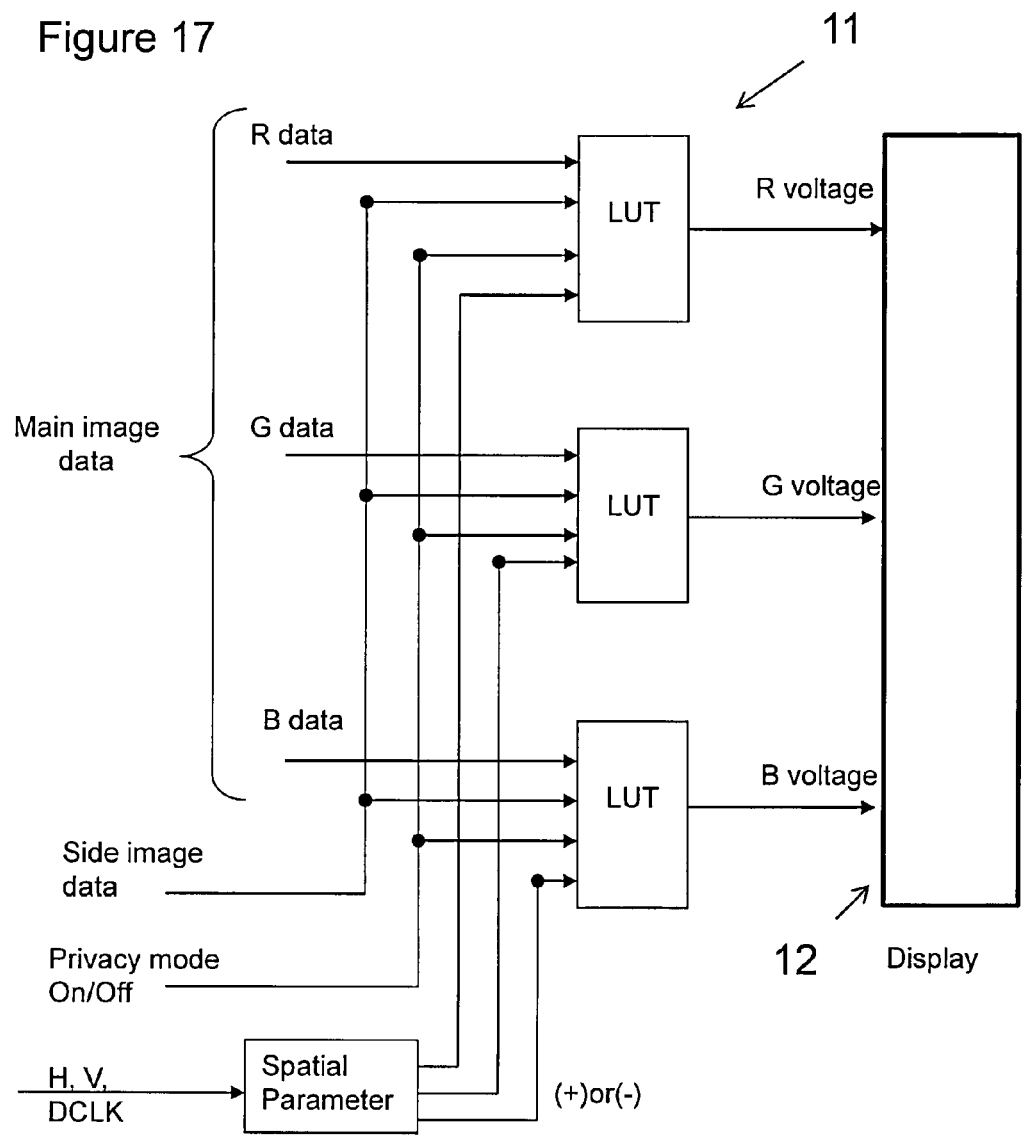
FIG. 17 is a schematic representation of display control electronics modified from the standard in order to provide a switchable privacy display of the prior art.

A table illustrating average pixel luminance for a pair of pixels is shown in FIG. 6. With no pixel splitting, pixel 2a and pixel 2b are shown, for example, to have the same luminance values and hence the same average luminance on-axis. However, owing to the non-linear off-axis luminance to on-axis luminance relationship as illustrated in FIG. 5, the average luminance for pixel 2a and pixel 2b with no splitting is not equal to the average on-axis luminance. With pixel splitting, pixel 2a and pixel 2b are shown to have different luminance values but have the same average luminance on-axis as the no pixel splitting situation. Owing to the non-linear off-axis luminance to on-axis luminance relationship as illustrated in FIG. 5, the average luminance for pixel 2a and pixel 2b with splitting is not equal to the average off-axis luminance of the no pixel splitting situation. Consequently, off-axis contrast between the pair of pixels that has not undergone splitting and the pixels that have undergone splitting is evident. In general, a first pair of pixels with a given degree of splitting can be arranged to have the same on-axis luminance but a different off-axis luminance as a second pair of pixels, whereby the second pair of pixels have a different degree of spitting to the first pair of pixels. The table in FIG. 6 also illustrates that the "Pixel Splitting 1" situation and the "Pixel Splitting 2" situation are identical for both an on-axis view and an off-axis view. The "Pixel Splitting 1" situation and the "Pixel Splitting 2" situation are identical owing to the fact that pixel 2a and pixel 2b have an identical luminance against angle response, as illustrated in FIG. 3. With reference to FIG. 17, a standard (single viewing mode, 2D) display with angular viewing characteristics of the type illustrated in FIG. 3 and FIG. 4 may be adapted to provide a switchable privacy mode using the "pixel splitting" method described above and in GB2457106A by the inclusion of a modified control electronics 11 which is capable of operating in a different manner dependent on when the device (e.g., display panel 12) is in the public, or the private mode.

When the device is operating in the public mode, a set of main image data, constituting a single image, is input to the control electronics, in each frame period. The control electronics then outputs a set of signal data voltages to the LC panel. Each of these signal voltages is directed by the active matrix array of the LC panel to the corresponding pixel electrode and the resulting collective electro-optical response of the pixels in the LC layer generates the image.

The control electronics has a single mapping of input pixel data value to output pixel data voltage (Look-up table), which it applies to the process for all pixels. In some cases a different look-up table may be used for the red, green and blue sub-pixels of the display, but there is no variation in the mapping of input data to output voltage based on the spatial position of the pixel data within the image, or the pixel electrode within the display. Substantially the same image is then perceived by the on-axis viewer, and off-axis viewers, and the display can be said to be operating in a wide viewing mode. This situation can be said to be the standard method of operation for an LCD.

When the device is operating in the private mode, two image datasets are input to the control electronics, in every frame period: main image data, constituting a main image, and side image data, constituting a side image.

The control electronics then outputs a set of signal data voltages, one data voltage for each pixel in the LC panel as previously. However, the control electronics (display controller) now utilises an expanded look-up table (LUT) and the output signal data voltage for each pixel in the LC panel, constituting a combined image, is dependent on the data values for the corresponding pixel (in terms of spatial position in the image) in both the main, and side, images. The output data voltage for each pixel may also be dependent on a third parameter determined by the spatial position of the pixel within the display.

In this way, the standard LCD control electronics are modified to receive, and store in a buffer, two, rather than one, images per frame period, and also to map the data values of two input images to a single output voltage per pixel, possibly also taking into account a third, spatially dependent, parameter into this mapping. In this case the mapping of input image data to output pixel voltage is no longer identical for all pixels, or even all sub-pixels of the same colour component, in the display.

The third, spatially dependent, parameter may be a "flag" value indicating which of two or more groups the pixel is deemed to be in based on its spatial position. For example, pixels in odd numbered columns in the image array may be said to form one group and pixels in even columns another. The groups could also constitute odd and even pixel rows, or perhaps the two parts of a checkerboard arrangement of the pixel array, etc.

The output voltage from the control electronics then causes the LC panel to display a combined image which is the main image when observed by the main viewer, with minimal degradation of the main image quality. However, due to the different gamma curve characteristic of the LC panel for the off-axis viewers, these off-axis observers perceive the side image most prominently, which obscures and/or degrades the main image, securing the main image information to viewers within a restricted cone of angles centered on the display normal.

The first embodiment of the invention relates to the use of additional optics in conjunction with the image processing technique as described in GB2428152A1, to enhance the privacy strength of a display device 1. In order to implement the image processing technique, the display controller electronics may be substantially as those described above for the switchable privacy display of GB2457106A. The display controller electronics may use the spatial "flag" parameter to denote which of the two or more pixel types of the display with differing luminance against viewing angle response is being addressed, rather than to denote which of two or more groups the pixel is deemed to be in based on solely on its spatial position. The display controller electronics may use the spatial "flag" parameter as described in GB2457106A and a secondary "flag" parameter to denote which of the two or more pixel types of the display with differing luminance against viewing angle response is being addressed. In this case, the LUTs used in the control electronics may be double the size of those described in GB2457106A in order to incorporate output values for the increased number of combinations of input values that would result.

Figure 7:
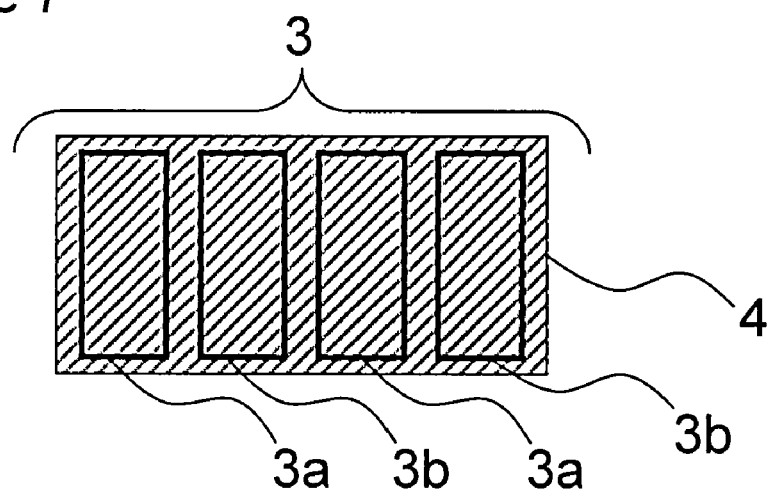
FIG. 7 illustrates an array of pixels and a lens array in plan view in accordance with an embodiment of the present invention.
Figure 8:
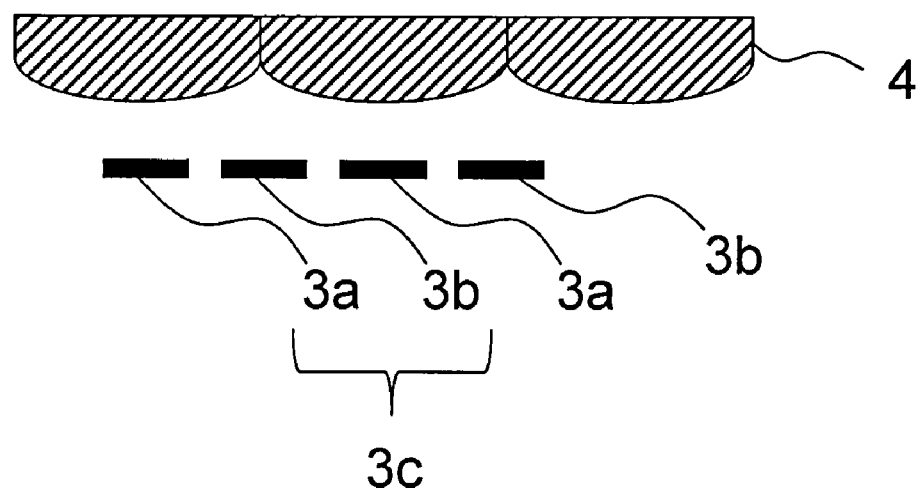
FIG. 8 illustrates the array of pixels and a lens array in side view in accordance with an embodiment of the present invention.
Figure 9:
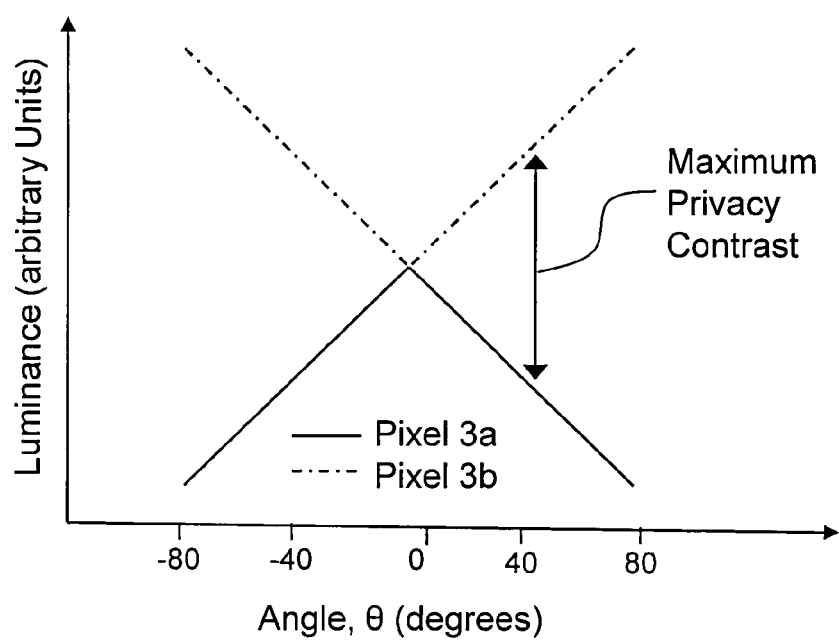
FIG. 9 illustrates angular dependent luminance responses for pixels in accordance with an embodiment of the present invention.

An array of pixels 3 (image elements) and a lens array 4, are shown in FIG. 7 and FIG. 8 respectively (pixels 3a and 3b forming a group 3c). The lens array has a pitch of substantially twice that of the pixel pitch. Pixel 3a has a first angular dependent luminance response while Pixel 3b has a second angular dependent luminance response that is substantially different from that of Pixel 3a. The angular dependent luminance response of Pixel 3a and Pixel 3b may be independent of on-axis luminance. An example of a preferred angular dependent luminance response for Pixel 3a and Pixel 3b for any given on-axis luminance is illustrated in FIG. 9. When used in conjunction with the image processing technique as described in GB2428152A1, the angular dependent luminance response illustrated in FIG. 9 would enable 100% resolution in the Normal wide view mode and good on-axis brightness in the Private narrow view mode. The privacy strength has been enhanced via the use of additional optics since the maximum privacy contrast can be contrived to surpass 2 since the off-axis luminance of Pixel 3a and Pixel 3b are significantly different. In general, the ratio of off-axis luminance at a given θ of Pixel 3a/Pixel 3b approximates the Maximum Privacy Contrast at the angle θ.

Figure 10:
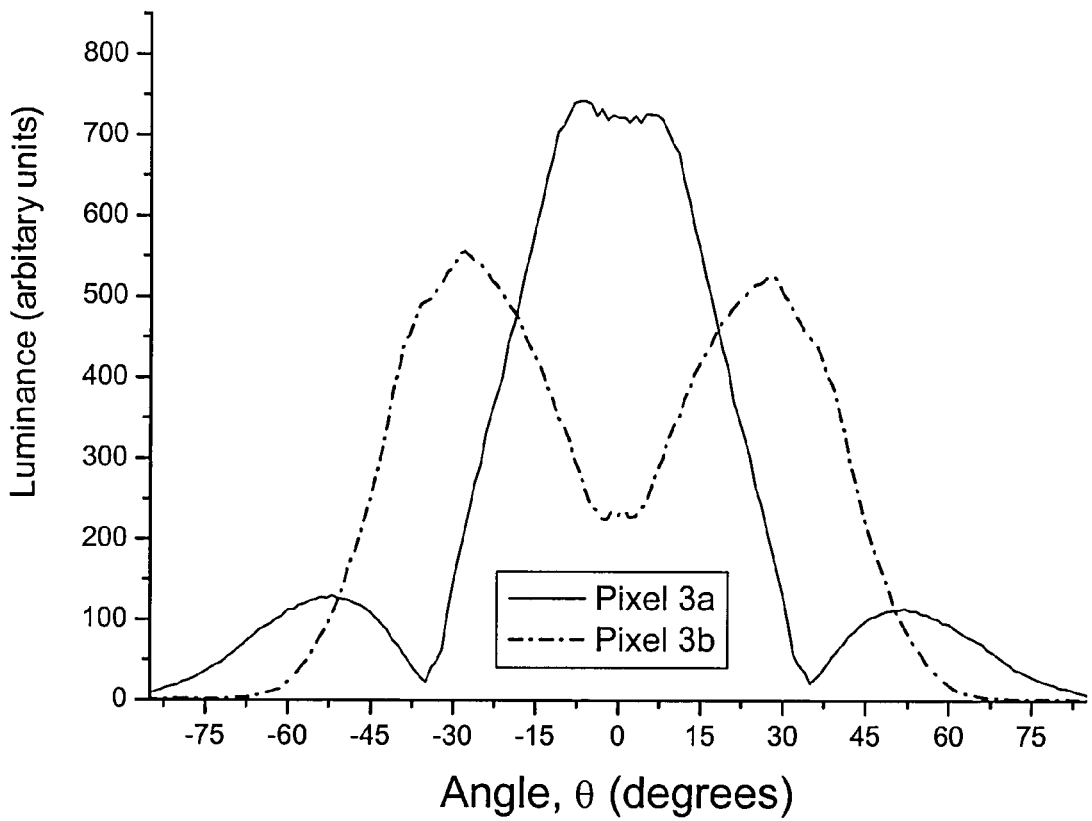
FIG. 10 illustrates angular dependent luminance responses for pixels in accordance with an embodiment of the present invention.

FIG. 9 and FIG. 10 are examples of angular dependent luminance responses for two pixels that will enable a privacy function with enhanced privacy strength when used in conjunction with image processing techniques as described in GB2428152A1, US20070040780A1 and GB2457106A. Upon first inspection, the functional forms of FIG. 9 and FIG. 10 appear significantly different; however, FIG. 9 and FIG. 10 both exhibit two key features that enable enhanced privacy strength to be achieved while maintaining 100% resolution for on-axis images. Firstly, both FIG. 9 and FIG. 10 have significantly different luminances for a range of given off-axis angles—this is a key feature to enable enhanced privacy strength when used in conjunction with the image processing techniques. Secondly, both FIG. 9 and FIG. 10 have an appreciable on-axis luminance so as to enable 100% resolution for on-axis images. A multitude of optical arrangements exist that enable angular dependent functional forms that exhibit these two essential features.

An example of a modelled angular dependent luminance response for Pixel 3*a* and Pixel 3*b* for achieving a privacy function with enhanced privacy strength is illustrated in FIG. 10. Pixel 3*a* and Pixel 3*b* may be white pixels within a display. Pixel 3*a* and Pixel 3*b* may be colour sub-pixels within a display. The parameters of the display and parallax optic used to achieve the plot in FIG. 10 are as follows: width of Pixel 3*a*=100 μm, width of Pixel 3*b*=100 μm, pixel to lens distance=200 μm, lens width=200 μm, lens radius of curvature=300 μm, refractive index of lens=1.56. In this example, the parallax optic is comprised entirely of a lens array. The lens apex is centered about Pixel 3*a*, as illustrated in FIG. 8. The curved surface of the lens is surrounded by air. The curved surface of the lens may be closest to the pixels or furthest from the pixels. In general, the pixel to lens distance is approximately the same as the lens width. As illustrated in FIG. 8, twice the pixel width is substantially the same as the lens width. The lens radius is chosen such that the luminance functional form of Pixel 3*a* and Pixel 3*b* are substantially different on-axis and off-axis. The parallax optics and display have been arranged such that some luminance from pixel 3*b* is viewable on-axis so as to enable images to be shown with 100% resolution. An advantage of a lens only system for achieving different luminance functional forms is that the overall brightness of the display system is higher than for a system that is comprised to some extent of parallax barrier.

The use of a lens array is just one example of an optical element that, when used in conjunction with a display device 1, creates pixels with multiple angular dependent luminance responses. In general, a display device 1 that has at least two different types of pixel whereby each pixel type has a substantially different angular dependent luminance response (i.e., a display with directional pixels) may also be formed via any of a variety of different optical elements or parallax optical elements. The parallax optic may be a parallax barrier that is comprised of transmissive and non-transmissive regions. The parallax optic may be comprised of a lens and parallax barrier array. The parallax optic may be comprised of a prism array. The parallax optic may be period in one dimension. The parallax optic may be periodic in two dimensions, for example. The directional pixels in transmissive displays may be formed via directional backlighting, for example. The directional pixels may be formed via patterned holographic or diffractive optical elements, for example. The directional pixels may be formed via patterned optical retarders, for example. The directional pixels may be formed via a collimated backlight and patterned scattering optics, for example.

The use of a parallax barrier only optic to achieve angular dependent luminance responses for Pixel 3*a* and Pixel 3*b*, that is approximately the same as that depicted in FIG. 10, for realizing a privacy function with enhanced privacy strength can be achieved with the following parameters: width of Pixel 3*a*=100 μm, width of Pixel 3*b*=100 μm, pixel to parallax barrier distance=200 μm, parallax barrier aperture=130 μm. The parallax barrier aperture is centered about Pixel 3*a*. In general, the pixel to parallax barrier distance is approximately the same as the parallax barrier pitch. As illustrated in FIG. 8, twice the pixel width is substantially the same as the parallax barrier pitch. The parallax barrier aperture is chosen such that the luminance functional form of Pixel 3*a* and Pixel 3*b* are substantially different on-axis and off-axis. The parallax barrier aperture is also chosen such that luminance from both Pixel 3*a* and Pixel 3*b* is observed on-axis so as to enable images to be shown with 100% resolution.

As demonstrated so far, the desired angular dependent luminance functional forms may be achieved by use of either a parallax optic that is comprised wholly of parallax barrier, or, a parallax optic that is comprised wholly of lenses. A parallax optic that is comprised of a parallax barrier and lens (whereby the lens is situated in the parallax barrier aperture) to achieve the desired angular dependent luminance responses, as depicted in FIG. 10, can also be used. An example set of parameters to realise the desired angular dependent luminance responses for a display and a parallax optic comprised of a lens and parallax barrier is as the follows: width of Pixel 3*a*=100 μm, width of Pixel 3*b*=100 μm, pixel to parallax optic distance=200 μm, parallax barrier aperture=160 μm, lens radius 400 μm. The lens apex is centered about Pixel 3*a*. The curved surface of the lens can be either closest or furthest from the pixel. The curved surface of the lens is surrounded by air. In general, the pixel to parallax optic distance is approximately the same as the parallax optic pitch. As illustrated in FIG. 8, twice the pixel width is substantially the same as the parallax optic pitch. The parallax optic aperture and lens radius is chosen such that the luminance functional form of Pixel 3*a* and Pixel 3*b* are substantially different on-axis and off-axis. The parallax optic aperture is also chosen such that luminance from both Pixel 3*a* and Pixel 3*b* is observed on-axis so as to enable viewing of images with 100% resolution.

The use of a parallax optic that is comprised of a prism array to achieve angular dependent luminance responses for Pixel 3*a* and Pixel 3*b*, for realizing a privacy function with enhanced privacy strength can be achieved with the following parameters: width of Pixel 3*a*=100 μm, width of Pixel 3*b*=100 μm, pixel to prism array distance=200 μm, prism angle 30° to 60°. The prism array is centered about Pixel 3*a* with the base of the prism positioned closed to the pixels. In general, the pixel to prism array distance is approximately the same as the parallax optic pitch. As illustrated in FIG. 8, twice the pixel width is substantially the same as the parallax optic pitch. The prism array is also chosen such that luminance from both Pixel 3*a* and Pixel 3*b* is observed on-axis so as to enable viewing of images with 100% resolution.

Figures 11, 12:
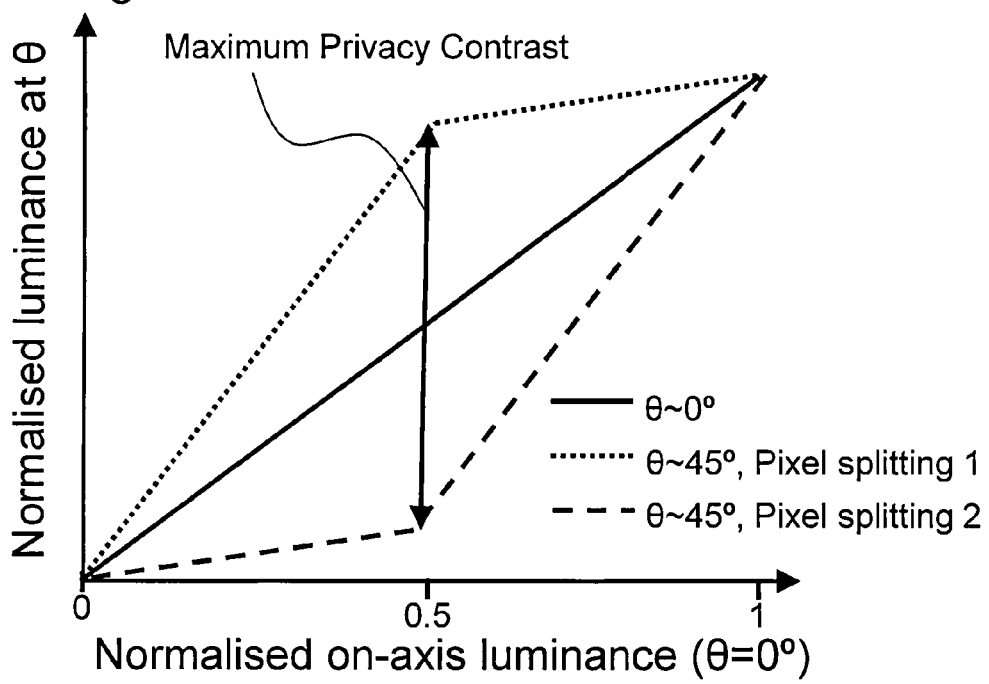
FIG. 11 is a plot of Normalised luminance at θ against Normalised on-axis luminance for a pair of pixels in accordance with an embodiment of the present invention.
FIG. 12 is a table illustrating average pixel luminance for a pair of pixels in accordance with an embodiment of the present invention.

The plot in FIG. 11 illustrates schematically the functional form of the Normalised luminance at θ against Normalised on-axis luminance (θ=0°) when the image processing technique as described in GB2428152A1 is applied to pixel 3*a* and pixel 3*b* that in turn have angular dependent luminance functional forms as shown in FIG. 9. A comparison between FIG. 5 and FIG. 11 reveals that the Maximum Privacy Contrast in FIG. 11 can be contrived to be greater than that shown in FIG. 5. Consequently, the privacy strength of the display system illustrated by FIG. 7, FIG. 8 and FIG. 9 can be larger than the privacy strength of the display system illustrated by FIG. 2, FIG. 3, FIG. 4, FIG. 5 and FIG. 6. In combination with image processing techniques described in GB2428152A1, the Maximum Privacy Contrast of a display system as illustrated by FIG. 7, FIG. 8 and FIG. 9 is enhanced relative to the display system illustrated by FIG. 2, FIG. 3, FIG. 4, FIG. 5 and FIG. 6 owing to the difference in off-axis luminance of pixel 3a and pixel 3b. In general, the greater the difference in off-axis luminance between pixel 3a and pixel 3b, for any given on-axis luminance, the greater the achievable Maximum Privacy Contrast.

However, it is also the case that if the display with multi-direction pixels of the type illustrated by FIG. 7, FIG. 8 and FIG. 9 is addressed with no splitting, or with a splitting amount designed to compensate for the differing angular dependent luminance functional forms, the combined off-axis luminance of the two pixels types may be contrived to follow a linear relationship with the on-axis luminance, and so provide a wide-viewing mode which has higher off-axis image quality than the display system of the type illustrated in FIG. 2 to FIG. 6 with inherently non-linear off-axis to on-axis luminance response in every pixel. It also the case that a display system of the type illustrated in FIG. 2 to FIG. 6 with inherently non-linear off-axis to on-axis luminance response in every pixel may be adapted by the addition of the image processing method and optical elements according to embodiments of this invention so that, in the public mode, a certain degree of splitting is applied to the pixels in order that the combined off-axis luminance of the two pixels types may be contrived to follow a more linear relationship with the on-axis luminance than the base panel alone would be capable of, therefore providing improved wide-viewing performance as well as an improved switchable privacy mode.

In general, the area enclosed by the "pixel splitting 1" and "pixel splitting 2" lines in FIG. 11 is the available off-axis/on-axis luminance space, and any combination of average on-axis and off-axis luminance may be produced which lies within this envelope. In order to reproduce a single image to all viewing angles as accurately as possible, as would be desirable in the public mode, the balance of luminances provided by pixel 3a and 3b may be determined so that the normalized on-axis and off-axis luminances are substantially the same. In order to reproduce a different image to the off-axis viewer which may obscure or disguise the on-axis image, as would be desirable in the private mode, the balance of luminances provided by pixel 3a and 3b at each point in the display may be determined so as to provide the on-axis luminance specified by the on-axis image at that point in the display, and the closest off-axis luminance within the available envelope to that specified by the off-axis image.

The enhancement of Maximum Privacy Contrast via the addition of optics to create pixels with different off-axis luminance responses is further illustrated by the table in FIG. 12. In contrast to FIG. 6, the "Pixel Splitting 1" situation and "Pixel Splitting 2" situation illustrated in FIG. 12 yields different off-axis luminance results. The contrast between off-axis "Pixel Splitting 1" and off-axis "Pixel Splitting 2" shown in FIG. 12 is larger than the contrast between off-axis "Pixel Splitting 1" and off-axis "No pixel splitting" shown in FIG. 6.

Some display devices, such as IPS LCD and OLED, have a luminance-data response that is not intrinsically compatible with the image processing technique described in GB2428152A1 and hence a private narrow view mode can't be realised for these display devices using the image processing technique described in GB2428152A1. The second embodiment of the invention relates to the use of additional optics with display types that are not intrinsically compatible with the image processing technique as described in GB2428152A1 so that a switchable privacy function can be realised for the display types.

Figure 13:
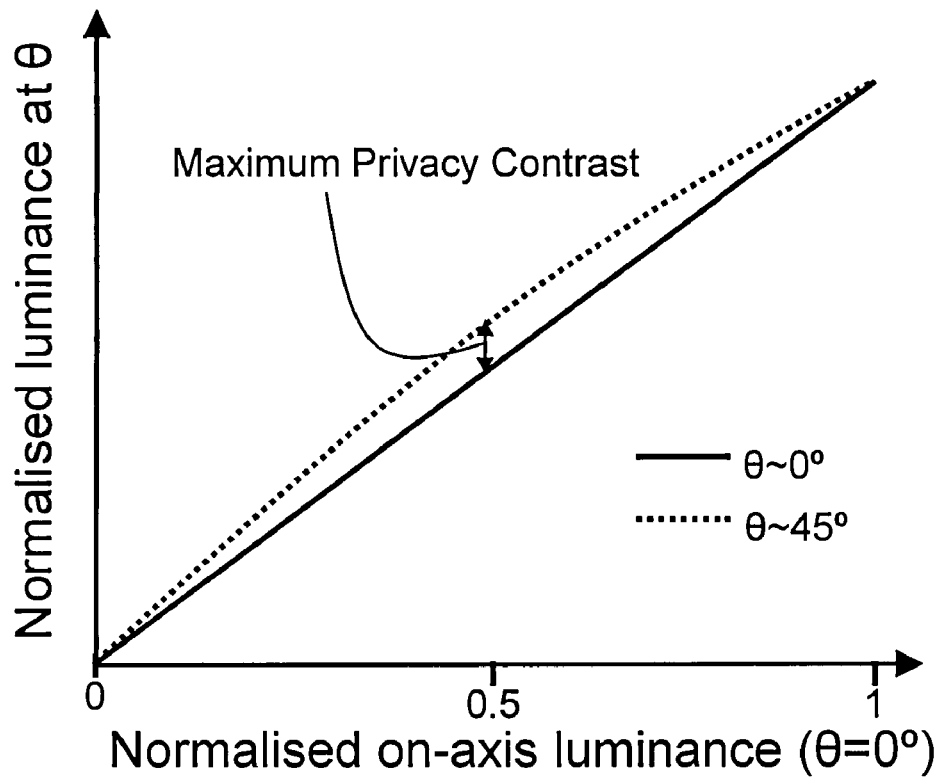
FIG. 13 is a plot representing a Normalised luminance at θ against Normalised on-axis luminance for a single pixel in accordance with known display devices.

The plot in FIG. 13 illustrates a typical Normalised luminance at θ against Normalised on-axis luminance of a single pixel in either an in-plane switching (IPS) LCD or an OLED. Contrary to FIG. 4, the plot in FIG. 13 illustrates that there is very little intrinsic difference between the on-axis normalised luminance and off-axis normalised luminance response for the display types. For any normalized on-axis luminance value, the corresponding normalized off-axis luminance is never more than 20% different. Consequently, displays with a luminance response characteristic similar to that depicted in FIG. 13 are not intrinsically compatible with the image processing technique as described in GB2428152A1. However, the addition of optics to display types that are intrinsically incompatible with the image processing technique as described in GB2428152A1 can enable a switchable privacy function for the display types. Such optics may comprise a lens array, as shown in FIG. 7 and FIG. 8, to enable a display device with two different pixels types, the different pixel types having different angular dependent luminance responses. Such optics, the details of which are described above, may enable angular dependent luminance responses as shown in either FIG. 9 or FIG. 10, for example. Consequently, the addition of optics to an IPS LCD or OLED for creating pixels with different angular dependent luminance responses can be used, in conjunction with the image processing technique described in GB2428152A1, to achieve a switchable privacy function. Examples of the additional optics required for IPS LCD or OLED etc. are identical to those described in the first embodiment.

The third embodiment of the invention relates to the use of additional of optics in conjunction with the image processing technique as described in GB2428152A1 to create a display device capable of a Normal Mode; an autostereoscopic 3D mode; a private narrow view mode for 2D images and text; and, a private narrow view mode for autostereoscopic 3D images (i.e. a mode for private viewing of 3D images).

Figure 14:
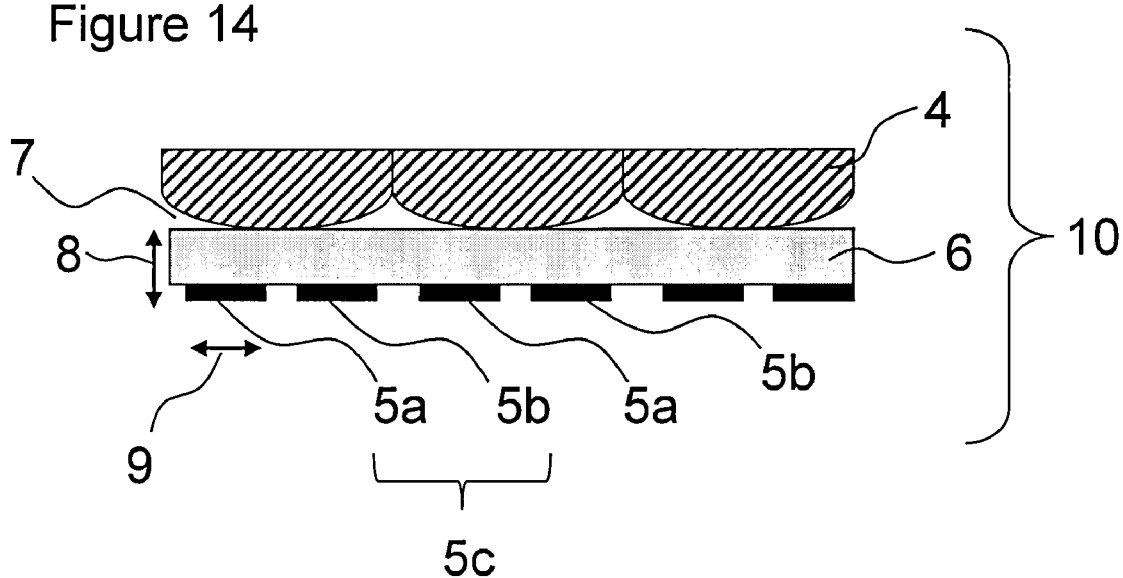
FIG. 14 illustrates in side view an array of pixels and a lens array in accordance with another embodiment of the present invention.
Figure 15:
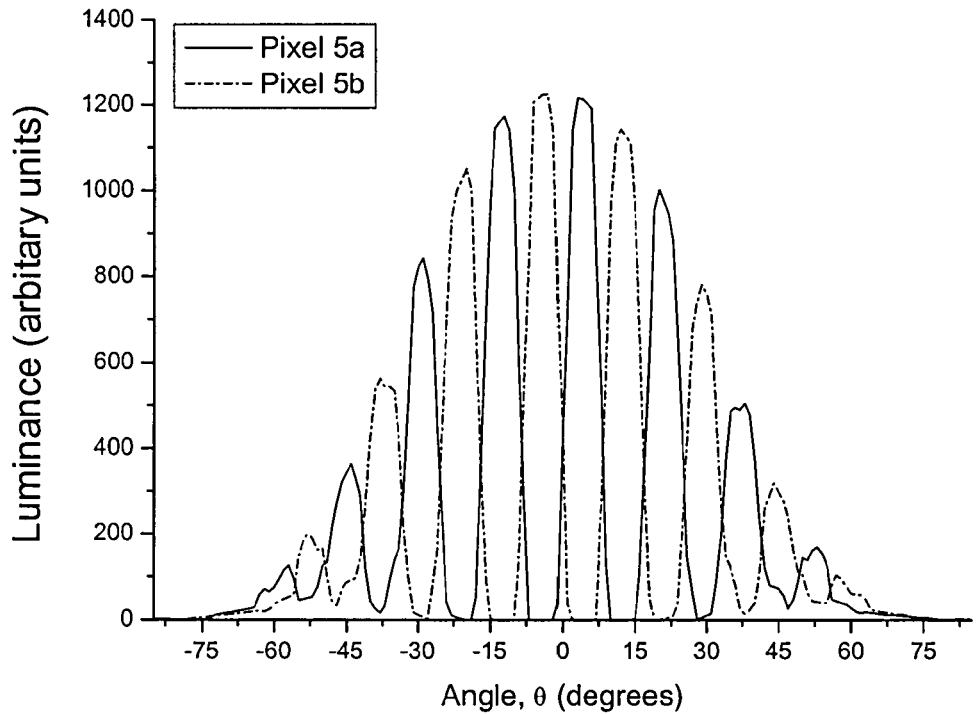
FIG. 15 illustrates angular dependent luminance responses for pixels in accordance with an embodiment of the present invention.
Figure 16:
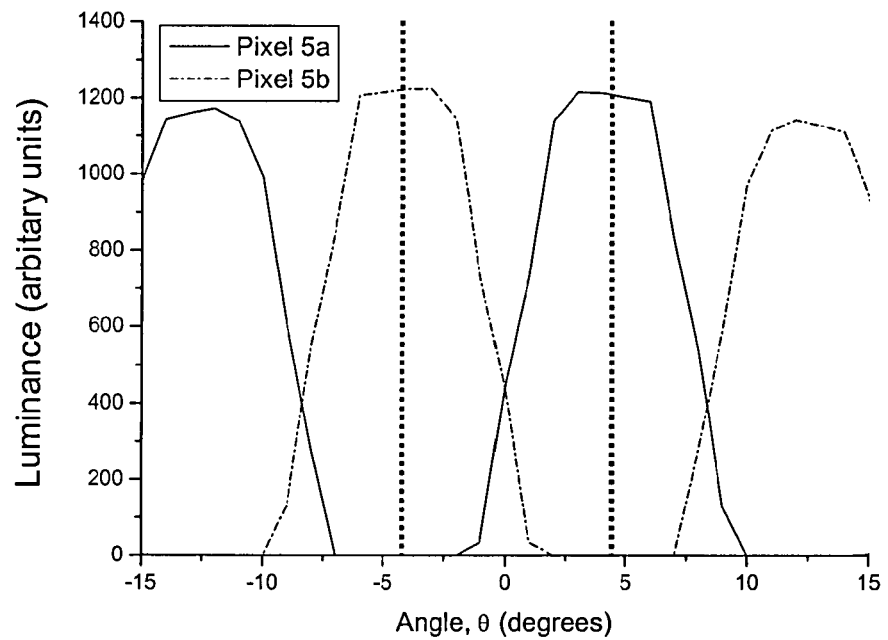
FIG. 16 illustrates angular dependent luminance responses for pixels in accordance with an embodiment of the present invention.

With reference to FIG. 14, a display with the capability to show autostereoscopic 3D images can be achieved with parallax optic 4 comprised entirely of a lens array. The parallax optic is centered symmetrically about Pixel 5a and Pixel 5b (pixels 5a and 5b forming a group 5c). Pixel 5a and Pixel 5b may be white pixels within a display. Pixel 5a and Pixel 5b may be colour sub-pixels within a display. This type of autostereoscopic 3D display has previously been disclosed and is therefore well known to those skilled in the art of autostereoscopic 3D display manufacture. Consequently, a brief description of FIG. 14 is contained for completeness in order to aid the reader. The autostereoscopic 3D display 10 shown in FIG. 14 of consists of a lens array 4 adhered to the uppermost surface of a display device 6 with glue. The refractive index of the lens array 4 is typically around 1.56, while the refractive index of the glue 7 is typically around 1.37. Typically, the refractive index difference between the lens array 4 and the glue is around 0.1 to 0.3—it is this refractive index mismatch that performs the pixel imaging function. The ratio of pixel width 9 to pixel-to-lens height 8 is around 10. The modelled angular dependent luminance response for the autostereoscopic 3D display 10 is shown in FIG. 15 and FIG. 16 using the following parameters: pixel width 9=100 μm, pixel to lens apex distance 8=1000 μm, lens width=200 μm, refractive index of the glue 7=1.37, refractive index of the lens array 4=1.56, lens radius 200 μm. FIG. 16 is an enlarged section of the FIG. 15. Alternatively, the lens array may be placed such that the lens apex is furthest from the pixels, in which case no index mismatching glue 7 is required the lens array should have a radius of around 500 μm with the lens curvature in contain with air.

An alternative parallax optic for achieving angular dependent luminance functional forms for two pixels that are similar to that shown in FIG. 15 can be achieved using parallax optic comprised entirely of parallax barrier with the following parameters: width of Pixel 5a=100 μm, width of Pixel 5b=100 μm, pixel to parallax optic distance=1000 μm, parallax barrier aperture=60 μm. The parallax optic is centered symmetrically about Pixel 5a and Pixel 5b. As illustrated in FIG. 14, twice the pixel width is substantially the same as the parallax optic pitch.

An alternative parallax optic for achieving angular dependent luminance functional forms for two pixels that are similar to that shown in FIG. 15 can be achieved using parallax optic comprised of a parallax barrier and lens (whereby the lens is situated in the parallax barrier aperture) with the following parameters: width of Pixel 5a=100 μm, width of Pixel 5b=100 μm, pixel to parallax optic distance=1000 μm, parallax barrier aperture=130 μm, lens radius of 300 μm, refractive index of lens=1.56. The parallax optic is centered symmetrically about Pixel 5a and Pixel 5b and place such that the apex of the lens is furthest from the pixels. As illustrated in FIG. 14, twice the pixel width is substantially the same as the parallax optic pitch.

Features of the angular dependent luminance functional forms illustrated in FIG. 15 and FIG. 16 include a luminance peak for a first pixel occurs at a given angle that is a minimum in luminance for a second pixel. The angular separation of the luminance peaks of the first and second pixels, as illustrated in FIG. 15 and FIG. 16, is approximately 9 degrees. An angular separation in luminance peaks of 9 degrees defines distance at which 3D autostereoscopic images must be viewed from. The viewing distance, Vd, is determined by $$Vd = \frac{(0.5 * s)}{\tan^{-1}(0.5 * a)}$$

where "s" is the eye separation distance and "a" is the angular separation of the peak luminances.

In order to contrive a display device capable of a Normal Mode, an autostereoscopic 3D mode, a private narrow view mode for 2D images and text, and, a private narrow view mode for autostereoscopic 3D images, the appropriate mapping function for the image data values must be established. For the previous embodiments described within this invention, this mapping function is derived according to the image processing technique as described in GB2428152A1. GB2428152A1 teaches that the mapping function is derived from the on-axis (θ=0°) luminance-data response and the off-axis luminance-data response for a given θ. However, for the 3D display, it is not optimal to use the on-axis luminance-data response at θ=0°. Instead, it is preferable to derive the mapping function from the luminance-data response at the angle θ that corresponds to the first off-axis luminance maximum. As illustrated in FIG. 16, the first off-axis luminance maxima are shown by the vertical dotted lines to occur at approximately ±4.5°. It is also preferable to derive the mapping function from the off-axis luminance-data response at an angle θ that corresponds to both a luminance maximum and an angle at which the maximum privacy strength is required. Nominally, maximum privacy strength is required within in the range 30° to 60° with ~45° being a good working value.

In general, the use of image processing techniques as described above and in GB2428152A1A can be used in conjunction with any autostereoscopic 3D display device in order to yield a display device capable of a Normal Mode, an autostereoscopic 3D mode, a private narrow view mode for 2D images and text, and, a private narrow view mode for autostereoscopic 3D images. The use of on-axis and off-axis luminance responses at angles that corresponding to maxima in luminance provides an optimal way for deriving the mapping functions for the data to signal voltages.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A display device having a display panel for displaying an image by spatial light modulation, comprising:
    a plurality of pixel groups, each pixel group including
        a first pixel having a first type of luminance against viewing angle response, and
        a second pixel having a second type of luminance against viewing angle response, wherein the first and second luminance against viewing angle responses are different from one another; and
    a controller operatively coupled to each of the plurality of pixel groups, wherein the controller is configured to drive each of the plurality of pixel groups such that on average the plurality of pixel groups simultaneously provide a predetermined on-axis luminance and an predetermined off-axis luminance for a region of the image corresponding to each pixel group.

2. The display device according to claim 1, wherein the controller is further configured to control the plurality of pixel groups such that the average off-axis luminance of each pixel group is controlled independent of the average on-axis luminance.

3. The display device according to claim 1, wherein the controller is further configured to control a share of the overall luminance of the pixel group that is produced by each individual pixel within the pixel group,
    wherein increasing the share of overall luminance produced by the first pixel within the pixel group and decreasing the share of overall luminance produced by the second pixel within the pixel group increases the overall off-axis luminance, and
    wherein decreasing the share of overall luminance produced by the first pixel within the pixel group and increasing the share of overall luminance produced by the second pixel of the pixel group decreases the overall off-axis luminance.

4. The display device according to claim 1, wherein the controller is further configured to drive each pixel group of the plurality of pixel groups such that each pixel group produces an average on-axis luminance dependent on image data corresponding to a spatial region of an input image that each pixel group occupies in the display panel, and an off-axis luminance that is proportional to the on-axis luminance so as to reproduce the input image to viewing angles greater than 35 degrees to a normal of the display panel surface.

5. The display device according to claim 1, wherein the controller is further configured to drive each pixel group such that each pixel group produces an average on-axis luminance dependent on first image data corresponding to a spatial region of a main input image that each pixel group occupies in the display panel, and a simultaneous off-axis luminance that is independent of the first image data.

6. The display device according to claim 5, wherein the off-axis luminance is dependent on data corresponding to a spatial region of a secondary image data different from the first image data that each pixel group occupies in the display panel.

7. The display device according to claim 1, wherein in a first viewing mode the controller is configured to apply first and second signal voltages to the first and second pixels, respectively, such that on average the pixel group produces generally the same viewing angle to luminance response over a predetermined viewing range, and in a second viewing mode the controller is configured to apply third and fourth signal voltages to the first and second pixels, respectively, such that on average at least some pixel groups produce a viewing angle to luminance response that varies over the predetermined viewing range.

8. The display device according to claim 7, wherein in the first viewing mode the respective signal voltages are based on an image data value for each pixel, and in the second viewing mode the respective signal voltages are based on the image data value for each pixel and a predetermined secondary value.

9. The display device according to claim 1, wherein the luminance against viewing angle response for at least one of the first or second pixel of at least one pixel group is independent of an absolute luminance value.

10. The display device according to claim 1, wherein the luminance against viewing angle response for at least one of the first or second pixel of at least one pixel group is dependent on of an absolute luminance value.

11. The display device according to claim 1, wherein the different luminance against viewing angle response of the first and second pixels of at least one pixel group is utilized such that in at least one display mode a normalized average off-axis luminance of each pixel group approximates a normalized average on-axis luminance of each pixel group.

12. The display device according to claim 1, wherein the luminance against viewing angle responses of the first and second pixels of at least one pixel group are configured to allow the display panel to produce an autostereoscopic 3D image in one viewing mode, a privacy effect in another viewing mode, and a simultaneously autostereoscopic 3D image with privacy effect in a third viewing mode.

13. The display device according to claim 1, wherein at least one of the first or second pixels includes parallax optics arranged relative to the first and second pixels.

14. The display device according to claim 13, wherein the parallax optics are symmetrically centered about the first and second pixels.

15. The display device according to claim 13, wherein the parallax optics comprise at least one of a lens array, a parallax barrier, or a prism array.

16. The display device according to claim 15, wherein the parallax optics comprise a lens array, wherein a pitch of the lens array is two times a pitch of the first or second pixels.

17. The display device according to claim 15, wherein the parallax optics comprise a parallax barrier, and a pixel to parallax distance set to a pixel pitch.

18. The display device according to claim 13, wherein the parallax optics are periodic in at least one dimension.

19. The display device according to claim 13, wherein the parallax optics are configured to modify an intrinsic luminance-data response of the first and second pixels.

20. The display device according to claim 1, wherein the luminance against viewing angle response of the first and second pixels is generated using at least one of a directional backlight, a patterned holographic or diffractive optical element, a patterned optical retarder, a collimated backlight and pattern scattering optics, or patterned out-coupling optics.

21. The display device according to claim 1, wherein the display panel comprises at least one of a liquid crystal display, an organic light emitting diode display, a plasma display, a field emission display, or a surface-conduction electron-emitter display.

22. The display device according to claim 1, wherein a difference between the luminance against viewing angle response of the first and second pixels is less than 20 percent.

23. A method for creating at least two viewing modes on a display device, the display device including a plurality of pixel groups each having at least two pixels, the method comprising:
creating a first type of luminance against viewing angle response for one pixel of the at least two pixels;
creating a second type of luminance against viewing angle response for the other pixel of the at least two pixels, wherein the first and second luminance viewing angle response are different from one another;
driving each of the plurality of pixel groups such that on average the plurality of pixel groups simultaneously provide a predetermined on-axis luminance and an predetermined off-axis luminance for a region of the image corresponding to each pixel group.

* * * * *